United States Patent
Sokoll et al.

(10) Patent No.: US 7,711,469 B2
(45) Date of Patent: May 4, 2010

(54) METHOD AND DEVICE FOR CONTROLLING THE BRAKING SYSTEM OF A MOTOR VEHICLE

(75) Inventors: Guenther Sokoll, Olching (DE);
Christian Scheinost, Ergolding (DE);
Toni Braeuer, Ludwigsburg (DE);
Simon Schilling, Abstatt (DE)

(73) Assignees: Bayerische Motoren Werke Aktiengesellschaft, Munich (DE);
Robert Bosch GmbH, Stuttgart (DE)

( * ) Notice: Subject to any disclaimer, the term of this patent is extended or adjusted under 35 U.S.C. 154(b) by 207 days.

(21) Appl. No.: 11/905,382

(22) Filed: Sep. 28, 2007

(65) Prior Publication Data

US 2008/0071459 A1 Mar. 20, 2008

Related U.S. Application Data

(63) Continuation of application No. PCT/EP2006/002208, filed on Mar. 10, 2006.

(30) Foreign Application Priority Data

Mar. 31, 2005 (DE) .................. 10 2005 014 801

(51) Int. Cl.
*B60T 8/00* (2006.01)
(52) U.S. Cl. ................. 701/83; 701/74; 477/4; 477/5; 477/166; 477/182
(58) Field of Classification Search ............. 701/81, 701/69, 71, 82, 70, 83, 74; 180/197, 247, 180/198; 303/138, 139, 141, 143, 156, 113.1; 477/4, 5, 6, 8, 9, 39, 40, 166, 182
See application file for complete search history.

(56) References Cited

U.S. PATENT DOCUMENTS 5,454,629 A * 10/1995 Johnson .................. 303/156

(Continued)

FOREIGN PATENT DOCUMENTS

DE 3527959 A1 2/1987

(Continued)

OTHER PUBLICATIONS

"xDrive Der neue Allradantrieb im BMW X3 und BMW X5", Titelthema BMW xDrive, ATZ, Feb. 2004, pp. 92-102.

(Continued)

*Primary Examiner*—Tuan C To
(74) *Attorney, Agent, or Firm*—Crowell & Moring LLP

(57) ABSTRACT

A process and device for controlling the brake system of a motor vehicle with all-wheel drive are described. The process and the device include an electronic control unit which controls at least one coupling unit for engaging and disengaging an all-wheel drive, so that at least one wheel can be decoupled, from the drive. After stopping the motor vehicle, for example on a sloping roadway, a predefined brake pressure on at least one wheel of the motor vehicle is held either depending on or independently from the extent of brake pedal actuation. The brake pressure is held until a brake pressure reduction condition is present, such as during a brake pressure holding time. During that time, the brake pressure on at least the one wheel is reduced and the wheel is decoupled from the drive to detect slippage, while at least one other wheel remains pressurized with brake pressure.

16 Claims, 2 Drawing Sheets

U.S. PATENT DOCUMENTS

| | | | |
|---|---|---|---|
| 5,599,075 A * | 2/1997 | Hara et al. | 303/143 |
| 5,607,207 A * | 3/1997 | Nagashima et al. | 303/113.1 |
| 5,918,953 A | 7/1999 | Nihei et al. | |
| 5,979,619 A | 11/1999 | Rump | |
| 6,056,373 A | 5/2000 | Zechmann et al. | |
| 6,132,014 A * | 10/2000 | Kiso et al. | 303/146 |
| 6,182,001 B1 * | 1/2001 | Sugai et al. | 701/78 |
| 6,315,372 B1 | 11/2001 | Kroger et al. | |
| 6,385,524 B2 * | 5/2002 | Hano et al. | 701/80 |
| 6,421,598 B1 * | 7/2002 | Oshiro | 701/71 |
| 6,428,120 B1 | 8/2002 | Holl | |
| 6,439,675 B1 | 8/2002 | Zechmann et al. | |
| 6,453,228 B1 * | 9/2002 | Shimada | 701/89 |
| 6,564,139 B2 * | 5/2003 | Sakakiyama | 701/89 |
| 6,814,414 B1 | 11/2004 | Schmitt et al. | |
| 6,964,460 B2 * | 11/2005 | O'Dea | 303/139 |
| 2002/0107628 A1 * | 8/2002 | Sakakiyama | 701/89 |
| 2003/0163238 A1 * | 8/2003 | Matsumoto et al. | 701/70 |
| 2005/0140207 A1 * | 6/2005 | Goebels et al. | 303/140 |
| 2005/0200198 A1 * | 9/2005 | Rudd, III | 303/167 |
| 2006/0017322 A1 * | 1/2006 | Kojima et al. | 303/139 |
| 2006/0102394 A1 * | 5/2006 | Oliver | 180/65.2 |
| 2007/0164608 A1 | 7/2007 | Streit et al. | |

FOREIGN PATENT DOCUMENTS

| | | |
|---|---|---|
| DE | 196 11 359 C1 | 8/1997 |
| DE | 196 25 919 A1 | 1/1998 |
| DE | 199 41 482 A1 | 4/2000 |
| DE | 198 48 448 A1 | 5/2000 |
| DE | 199 39 979 A1 | 8/2000 |
| DE | 100 26 102 A1 | 2/2001 |
| DE | 199 50 028 A1 | 4/2001 |
| DE | 199 50 034 A1 | 4/2001 |
| DE | 199 50 162 A1 | 5/2001 |
| DE | 101 51 846 A1 | 5/2002 |
| DE | 103 22 125 A1 | 12/2004 |
| EP | 0 774 390 B1 | 8/2003 |
| JP | 08091198 A * | 4/1996 |

OTHER PUBLICATIONS

"Dynamische Stabilitäts Control DSC der Baureihe 7 von BMV—Teil 2", Fahrwerk, ATZ Automobiltechnische Zeitschrift 99, 1997 vol. 4, pp. 208-213.

German Search Report dated Jun. 6, 2005 including English translation of pertinent portion (Eight (8) pages).

German Search Report dated Jun. 17, 2005 with English translation of relevant portion (Eight (8) pages).

\* cited by examiner

METHOD AND DEVICE FOR CONTROLLING THE BRAKING SYSTEM OF A MOTOR VEHICLE

CROSS REFERENCE TO RELATED APPLICATIONS

This application is a continuation of PCT International Application No. PCT/EP2006/002208, filed Mar. 10, 2006, which claims priority under 35 U.S.C. § 119 to German Patent Application No. 10 2005 014 801.8 filed Mar. 31, 2005, the entire disclosures of which are herein expressly incorporated by reference.

BACKGROUND AND SUMMARY OF THE INVENTION

The invention relates to a process, method and a device for controlling the brake system of a motor vehicle.

Various patent document, such as German Documents DE 199 50 034 A1, DE 196 11 359 C1, DE 199 50 162 B4, DE 198 48 448 C2, DE 101 51 846 B4, DE 199 41 482 A1 and others, describe processes and devices which are supposed to serve to prevent vehicles from rolling away, in particular, but not necessarily, on slopes. In these, in at least one operational state, braking force on at least one wheel is usually held or actively increased with the actuated brake pedal or another actuation element, depending on or independently from the extent of actuation of the brake pedal or other actuation element. For the activation or deactivation of the function, different entry and/or triggering conditions together or alternatively are provided therein.

These processes or devices are known under various names, such as Start Driving Assistant, Mountain Assistant, Hill Hold(er), or Automatic Hold. For example, a hydraulic, mechanical, or pneumatic, electronically controllable braking system, using which the holding in place and preventing from rolling of the vehicle is achieved, is common to all these processes. Also, processes are known in which the rolling of the vehicle is prevented via the transmission (in particular automatic transmission). In all these functions an activation of the function is carried out, for example, by actuation of the brake pedal or the parking brake or via switching elements associated therewith or also other actuation elements (for example, switches, keys, or the like). A deactivation is done via the same or also other auxiliary elements (such as, for example, gas pedal position, clutch signal, drive torque signals of the motor, or the like or also after the expiration of a definite holding time). Important additional necessary auxiliary elements, control signals, switching elements, and the like for the representation of the functions are, for example, at least one speed signal for detecting that the vehicle is at a standstill, mechanical, pneumatic, or hydraulic actuators in the wheel brakes or in the feed lines to the wheel brakes, via which the braking action can be increased or reduced or held, at least temporarily (for example, control/regulation valves integrated in the form of a control or regulation device which is present, for example, ABS system, ASC/ASR system, DSC/ESP system), in given cases also longitudinal acceleration or slope sensors, by using which the longitudinal slope of the roadway, and from that the braking force required for secure standstill of the vehicle and the torque needed to set the vehicle in motion given the slope of the roadway, can be determined, and pressure sensors with whose aid the brake pressure or the braking torque applied to the wheel brake(s) can be determined.

Furthermore, from German Patent Document DE 103 22 125 A1 a device for controlling the brake system of a vehicle is known, in which device, while the vehicle is at a standstill, the braking force on at least one wheel of the vehicle is held depending on or independently of the extent of brake pedal actuation. Along with this, measures for detecting slippage of the vehicle or any danger of slippage when the device is activated are presented. This detection of slippage consists of a rotary or translational motion of the vehicle being determined (for example, via angular velocity/yaw rate/yaw speed or transverse acceleration) and, depending on the value determined, termination of the function occurs, even before the expiration of any predefined holding time, if the value permits the inference of slippage of the vehicle.

The present invention, provides processes of the type stated in the introduction, which improve the detection of slippage.

According to the invention, a process and method for detecting slippage is described, which operates in case of a low coefficient of friction, even during a holding process by which any rolling away of the vehicle is to be prevented first of all by driver-independent setting of a predefined braking force on preferably all the wheels, so that the braking force on at least one wheel which is not driven is released, at least temporarily, so that the wheel can roll freely. If this wheel does not roll it is detected that the holding power of the remaining wheels is sufficient to hold the vehicle fixed on the corresponding slope. If this wheel does roll it is detected that the vehicle is slipping via the remaining braked wheels. If a low coefficient of friction or slippage of the vehicle is detected in this way, the braking force is preferably released on all the wheels in order to be able to better maneuver the vehicle in this situation.

This process was originally developed for application in vehicles driven with a single axle. In vehicles with permanent all-wheel drive or all-wheel drive which can be switched to via certain actuation elements or automatically (electronically controlled), this process cannot be applied without further effort since one cannot assume that at a standstill the drive train is separated in such a manner that at least one wheel is not driven and is thus freely rolling.

In vehicles with permanent all-wheel drive and in vehicles which can be switched manually to all-wheel drive, carrying out the detection of slippage according to the process stated above is not possible or not reasonable in the switched-to state (firmly coupled).

In vehicles with at least one electronically controllable coupling unit for switching to and out of all-wheel drive it is to be assumed that the coupling units which produce the drive of the wheels are closed when the vehicle is at a standstill for reasons of traction. Coupling units are understood to mean, for example, longitudinal clutches or longitudinal locks and/or transverse differential clutches or transverse differential locks.

According to exemplary embodiments of the invention, it is ensured that in vehicles with at least one electronically controllable coupling unit for the production of an all-wheel drive, such as, for example, with an electronically controllable longitudinal clutch there is, for carrying out a detection of slippage, at least one wheel which is not driven. In particular, for achieving this goal it is proposed to open at least one coupling which is present.

This exemplary embodiment can, for example, include a switchable longitudinal lock or a controllable longitudinal clutch through which, for example, the front axle is decoupled from the drive. Should a controllable transverse differential lock also be present on at least one axle, the opening of this transverse differential lock and a reduction of pressure on one wheel of this axle may be sufficient.

In connection with this embodiment, it is first checked whether the coupling unit(s) required for carrying out the detection of slippage is(are) opened. If this is not the case, the required coupling unit(s) is(are) opened for the purpose of the detection of slippage.

If it is not possible to open the coupling units required to carry out the detection of slippage, then carrying out the detection of slippage may be suppressed. From this action, on the one hand, an improvement in convenience or avoidance of noise follows and, on the other hand, an improvement in wear behavior due to the fact that the system components needed for detecting slippage are not actuated. A useless actuation of components for the distribution of brake pressure is avoided in this example, which would otherwise be necessary for maintaining the holding energy fed into the system (in particular startup of the hydraulic pump in hydraulic brake control systems, actuating the valves or similar components in other brake control systems).

However, with the coupling unit opened while a test to detect slippage (slippage detection routine) is being carried out, the driver cannot set the vehicle in motion as rapidly as possible with optimal propulsion, as desired in given cases. It is therefore ensured in an extension according to the invention that the opened coupling unit(s) is(are) closed once again at the necessary time, in particular if there is a wish to set the vehicle in motion.

The coupling unit(s) which are decoupled due to a test for slippage should therefore not only be coupled in once again when a brake pressure reduction condition, e.g., sufficient drive torque of the motor, is present, that is, only at the time of driving away. In situations where the vehicle is set in motion rapidly this can lead to loss of performance or limitations on convenience.

According to exemplary embodiments of the invention, a gain in performance will therefore be achieved by prompt detection of a situation in which it is the desire of the driver to set the vehicle in motion rapidly and in a manner optimized for propulsion and by immediate (before the actual process of setting the vehicle in motion) restoration of a completely closed (coupled) all-wheel drive train. Closing the coupling unit(s) before the process of setting the vehicle in motion also increases comfort. Thereby it is ensured that in the time after the process of setting the vehicle in motion no discontinuity caused by closing of the coupling unit(s) arises in the motion of the vehicle, where such a discontinuity could be perceived by the occupants of the vehicle as a jerk. Also the service lifetime of the coupling unit(s) is extended by the closing of the coupling unit(s) in the (nearly) unloaded state.

The detection of this situation, in which setting the vehicle in motion rapidly and in a manner optimized for propulsion is desired by the driver, can be coupled to various signals which permit the desire of the driver to be recognized, for example,

- pedal value (acceleration pedal actuated /not actuated) or corresponding value of another actuation unit. In this example, an alternative includes an acceleration pedal switch signal which senses an acceleration pedal position which corresponds to an acceleration pedal being depressed to between, for example, about 50% and about 100%
- pedal path/gradient: overshooting of a certain threshold of only one quantity or a combination of both
- clutch switch: in this example, an alternative includes a clutch switch signal which senses a clutch pedal position which corresponds to a clutch being closed to between 0 and, for example, about 50% (clutch switch sensing 100%, meaning that the clutch is completely closed would not be applicable)
- clutch path/gradient: overshooting of a certain threshold of only one quantity or a combination of both
- rotary speed/gradient of the motor: overshooting of a certain threshold of only one quantity or a combination of both
- torque/gradient of the motor: overshooting of a certain threshold of only one quantity or a combination of both
- (input/output) rotary speed/gradient of the transmission: overshooting of a certain threshold of only one quantity or a combination of both
- (input/output) torque/gradient of the transmission: overshooting of a certain threshold of only one quantity or a combination of both
- rotary speed (difference)/gradient for the coupling unit(s): overshooting of a certain threshold of only one quantity or a combination of both
- torque (difference)/gradient for the coupling unit(s): overshooting of a certain threshold of only one quantity or a combination of both In this exemplary embodiment, the signals indicating pedal value, pedal path/gradient, clutch path/gradient, and so on reflect the direct wish of the driver. The other signals should be supported by additional signals (for example, pedal value (acceleration pedal actuated/not actuated) or pedal path/gradient) or can be drawn upon for support (clutch switch/signal 0–x %).

With an overshoot of a currently defined threshold, it can be assumed according to this exemplary embodiment that the driver desires a rapid process for setting the vehicle in motion. Thus, according to the invention, a control command which permits and/or restores the completely closed state of the drive train may be supplied in these situations.

Other objects, advantages and novel features of the present invention will become apparent from the following detailed description of the invention when considered in conjunction with the accompanying drawings.

BRIEF DESCRIPTION OF THE DRAWINGS

In the drawings an exemplary embodiment of the invention is represented.

DETAILED DESCRIPTION OF THE DRAWINGS

Figure 1:
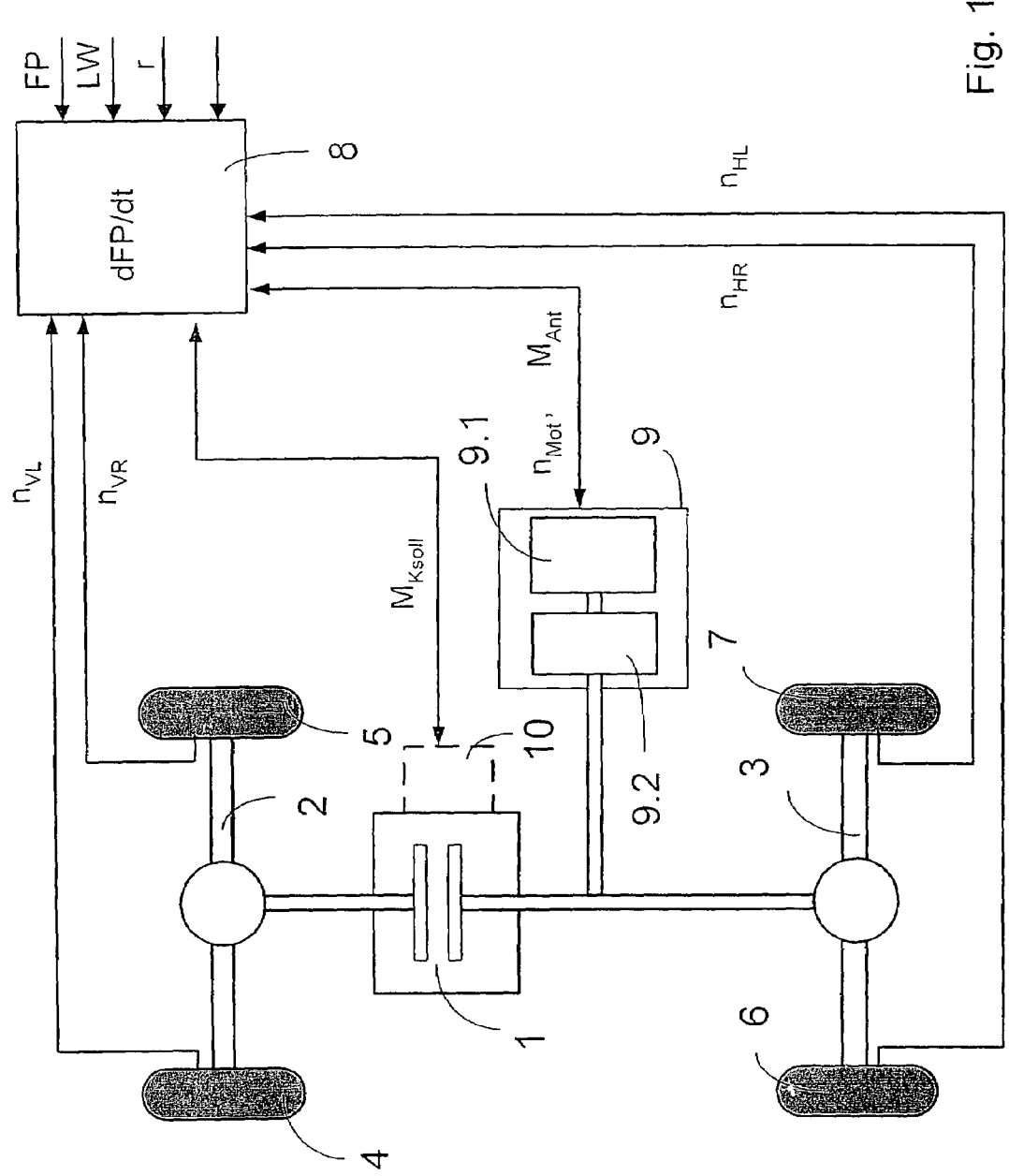
FIG. 1 is a schematic view of an all-wheel drive vehicle in which the device according to an embodiment of the invention can be used.

In the exemplary embodiment shown in FIG. 1, a vehicle is represented which is occasionally driven in all-wheel mode, and in the form of a basically rear-wheel-drive motor vehicle at other times and as a front-wheel drive vehicle. If needed or desired, one can switch between modes via a transmission clutch 1. The transmission clutch 1 can be set via a control unit 8. The control unit 8 can include an externally mounted auxiliary control device 10, e.g., mounted directly on the transmission clutch 1, where, for example, the auxiliary control device converts the predefined theoretical clutch torque into electrical current to control the displacement unit (not depicted here) of the transmission clutch 1.

In a vehicle of this type with controllable all-wheel drive the entire torque (drive torque) of the drive unit 9 is transmitted to the wheels 6 and 7 of the rear axle 3 when the transmission clutch 1 is open.

Preferably, the exemplary drive unit 9 may have an internal combustion engine 9.1, a transmission 9.2, and at least one drive control device (not shown in detail here). The drive control device communicates, e.g., via the known data bus CAN, with the control unit 8. In FIG. 1 the rear wheels 6 and 7 are the primary drive wheels since they are permanently connected to the drive unit 9. With increasing clutch torque at the transmission clutch 1 the drive unit 9 also drives the wheels 4 and 5 of the front axle 2. Thus the front wheels 4 and 5 are the secondary drive wheels.

The exemplary control unit 8 receives, in addition to other input signals, in particular an input signal for registering the position of an accelerator pedal, e.g., the actuation angle FP of the so-called acceleration and gas pedal. From this the control unit 8 determines the speed of the gas pedal actuation dFP/dt. Furthermore, the control unit 8 registers or determines the motor's rotary speed $n_{Mot}$, the motor torque (=internal combustion engine torque), or the drive torque $M_{Ant}$ (=torque of the Cardan shaft on the output side of the transmission), the steering angle LW, the yaw rate or yaw angle speed r, and the wheels' rotary speeds $n_{VL}$, $n_{HL}$, $n_{VR}$, $n_{HR}$ for all the wheels 4, 5, 6, and 7. From these rotary speeds $n_{VL}$, $n_{HL}$, $n_{VR}$, $n_{HR}$ in connection with other data present in the control unit 8, the wheel speeds $V_{VL}$, $V_{HL}$, $V_{VR}$, and $V_{HR}$ for all the wheels 4, 5, 6, and 7 as well as the vehicle speed v are determined.

To distribute the drive torque of the drive unit 9 a clutch torque $M_{KSoll}$ is predefined which is to be set for the transmission clutch 1 disposed between the drive unit 9 or the primary drive wheels 6 and 7 and the secondary drive wheels 4 and 5. Preferably the control unit 8 outputs the theoretical clutch torque $M_{KSkoll}$ to the auxiliary control device 10. The auxiliary control device 10 converts the theoretical clutch torque $M_{KSoll}$ into a current for controlling the actuator device.

The exemplary embodiments of the present invention are applicable, for example, to a type of all-wheel vehicle which may be similar to that described in the ATZ article "xDrive—Der neue Allradantrieb im BMW X3 und BMW X5" [="xDrive—The New All-wheel Drive in the BMW X3 and BMW X5"], 2/2004, page 92 ff. Furthermore, exemplary embodiments of the invention are applicable to a process and a device for controlling the brake system in a motor vehicle in which, to prevent the vehicle from rolling away after a holding process, a braking force is set on at least one wheel of the vehicle, preferably on all the wheels, independently of the driver, and is held during a predefined holding time. Conventional brake systems for carrying out the various braking functions described here are not described in greater detail, and may include, for example, ABS systems, ASC systems, and DSC systems with hill holder function. An exemplary brake control system which can be used for the invention may include, for example, a system described in ATZ article "Dynamische Stabilitats Control DSC der Baureihe 7 von BMW—Teil 2" [="Dynamic Stability Control DSC for Series 7 from BMW—Part 2"], 4/1997, page 211.

With an exemplary vehicle according to FIG. 1 the connection of the drive to the wheels of the front axle is undone by opening the controllable clutch unit, here in the form of the transmission clutch 1, so that here the two wheels 4 and 5 are decoupled from the drive and thus can be kept free from drive forces. The control of the clutch unit 1 is predefined here by the control unit 8 in the form of a theoretical clutch torque $M_{KSoll}$ which is then set by the auxiliary control device 10, if present.

The exemplary control unit 8 is preferably a control device in which the control of the brake system (e.g., as a braking function module) and the control of the clutch unit (e.g., as an all-wheel drive function module) are integrated.

For example, a part of the braking function module of the control unit 8, together with the actuators of the braking system, forms the elements for preventing rolling away, through which after stopping of the vehicle, at least on a sloping roadway, a predefined brake pressure on at least one wheel of the motor vehicle is held or increased depending on or independently of the extent of brake pedal actuation and held (further) until a brake pressure reduction condition is present (brake pressure holding time). Furthermore, for example, an additional part of the exemplary braking function module of the control unit 8, together with the sensors for detecting the rotary speeds $n_{VL}$, $n_{HL}$, $n_{VR}$, $n_{HR}$ for all the wheels 4, 5, 6, and 7, forms the slippage detection elements through which, during the brake pressure holding time, the brake pressure on at least one wheel is reduced or remains reduced, at least temporarily, where, for detecting slippage, the wheel is decoupled or becomes decoupled from the drive under corresponding control of the clutch unit while at least one other wheel remains pressurized with brake pressure.

In exemplary embodiments of the invention, the brake pressure holding time can be time-controlled or event-controlled. The end of the holding time can be specified by the expiration of a counter or a predefined period of time or by the occurrence of a definite event, such as, for example, the drive unit having drive torque sufficient for driving away without rolling back. It can, for example, also be selected for a predefined period of time of approximately 2 sec, in which the driver has enough time to switch from the brake pedal to the acceleration pedal.

In a first advantageous alternative embodiment, a predefined brake pressure on all four wheels 4, 5, 6, and 7 of the motor vehicle is held or increased, preferably after stopping of the motor vehicle, at least on an sloping roadway, depending on or independently of the extent of brake pedal actuation, and can be held (further) until a brake pressure reduction condition is present. During this basic brake pressure holding time the detection of slippage is carried out. For this it is first checked whether the coupling unit, here the transmission clutch 1, is closed or open. If it is already open, it remains open. If it is still closed it is first, for example, opened by the all-wheel drive function module of the control unit 8. Subsequently or simultaneously the brake pressure is, at least temporarily, completely eliminated on at least one wheel which has previously been decoupled from the drive under corresponding control by the coupling unit. Therefore here, for example, wheel 4 or 5 of the front axle 2 may be decoupled via the opened transmission clutch 1. The other three wheels remain pressurized with brake pressure. Should the vehicle slip, the wheel which is not braked would roll. The control unit 8 detects this by using the sensors for detecting the rotary speeds of the wheels. If within a predefined period of time, e.g., a definite minimum period of time required for the detection of slippage, no rolling or slippage has been detected, the slippage detection function can be deactivated once again. After that, the freely rolling wheel can be pressurized with brake pressure once again but does not have to be since obviously the three braked wheels are sufficient for holding the vehicle. The slippage detection function can, however, also be continued up to the occurrence of a definite event.

In a second advantageous exemplary embodiment, after stopping of the vehicle, at least on a sloped roadway, a predefined brake pressure on three wheels of the motor vehicle is held or increased depending on or independently of the extent of brake pedal actuation, and is basically held (further) until a brake pressure reduction condition is present. In so doing, the three wheels are chosen so that one wheel, which is decoupled from the drive when the clutch unit is open, is not pressurized with brake pressure. During this basic brake pressure holding time the detection of slippage is carried out once again. For this it is first checked whether the coupling unit, here the transmission clutch 1, is closed or open. If it is already open, it also remains open. If it is still closed it is first, for example, opened by the all-wheel drive function module of the control unit 8. Subsequently, the detection of slippage can be carried out immediately, as already described for the first alternative, without the necessity of the previous reduction of brake pressure on at least one wheel, which has previously been decoupled from the drive under corresponding control by the coupling unit. Here it has been assumed that three braked wheels are customarily sufficient for holding the vehicle.

The first alternative embodiment has the advantage that initially four braked wheels are most reliable for holding the vehicle. The second alternative has the advantage that changing the brake pressure on one wheel can be prevented.

It is significant for the invention that in the case of a hill holder function for detecting slippage in all-wheel vehicles, a coupling unit for decoupling at least one wheel from the drive is opened, and that this wheel is not pressurized with brake pressure. Exemplary slippage detection is thus carried out on a wheel with no braking pressure, and decoupled from the drive. This state for the detection of slippage can be produced for a limited or unlimited period of time during the brake pressure holding time.

In so doing, the reduction of the brake pressure on the one wheel during the braking force holding time can be carried out only for a minimum period of time required for the detection of slippage, in which period of time the at least one coupling unit opened for the decoupling of the wheel is held in the opened state. After the expiration of the predefined period of time the control of the coupling unit(s) is carried out during the remaining braking force holding time in such a manner that the all-wheel drive is engaged once again in order finally to offer the driver maximum traction when driving away.

Alternatively to or in addition to the predefinition of a (e.g., minimum required) period of time for the detection of slippage the control of the coupling units for re-engaging the all-wheel drive during the braking force holding time may be performed as soon as a definite event takes place which permits the system to infer the driver's wish to drive away rapidly. This exemplary event control may be, for example, useful for slippage detection which is not limited temporally and/or for a constant repetition of slippage detection during the brake pressure holding time in order to offer the desired performance to the driver when driving away at the end of the brake pressure holding time, as has already been discussed above. This event control is, however, also useful in the case that the driver already wishes to drive away during a temporally limited detection of slippage.

An exemplary event which permits the system to infer the driver's wish to drive away rapidly is, for example, the overshoot of a predefined acceleration pedal value or the closing of the clutch switch. Additional examples have already been discussed above.

In addition it is noted that an opening of the coupling unit in the example represented with a controllable transmission clutch corresponds to the predefinition of a minimal theoretical clutch torque $M_{KSoll}$ and that a closing of the coupling unit corresponds to the predefinition of an optimal theoretical clutch torque $M_{KSoll}$, for example, defined by the all-wheel drive function module, where the theoretical clutch torque can be the maximum possible theoretical clutch torque, but does not have to be.

Figure 2:
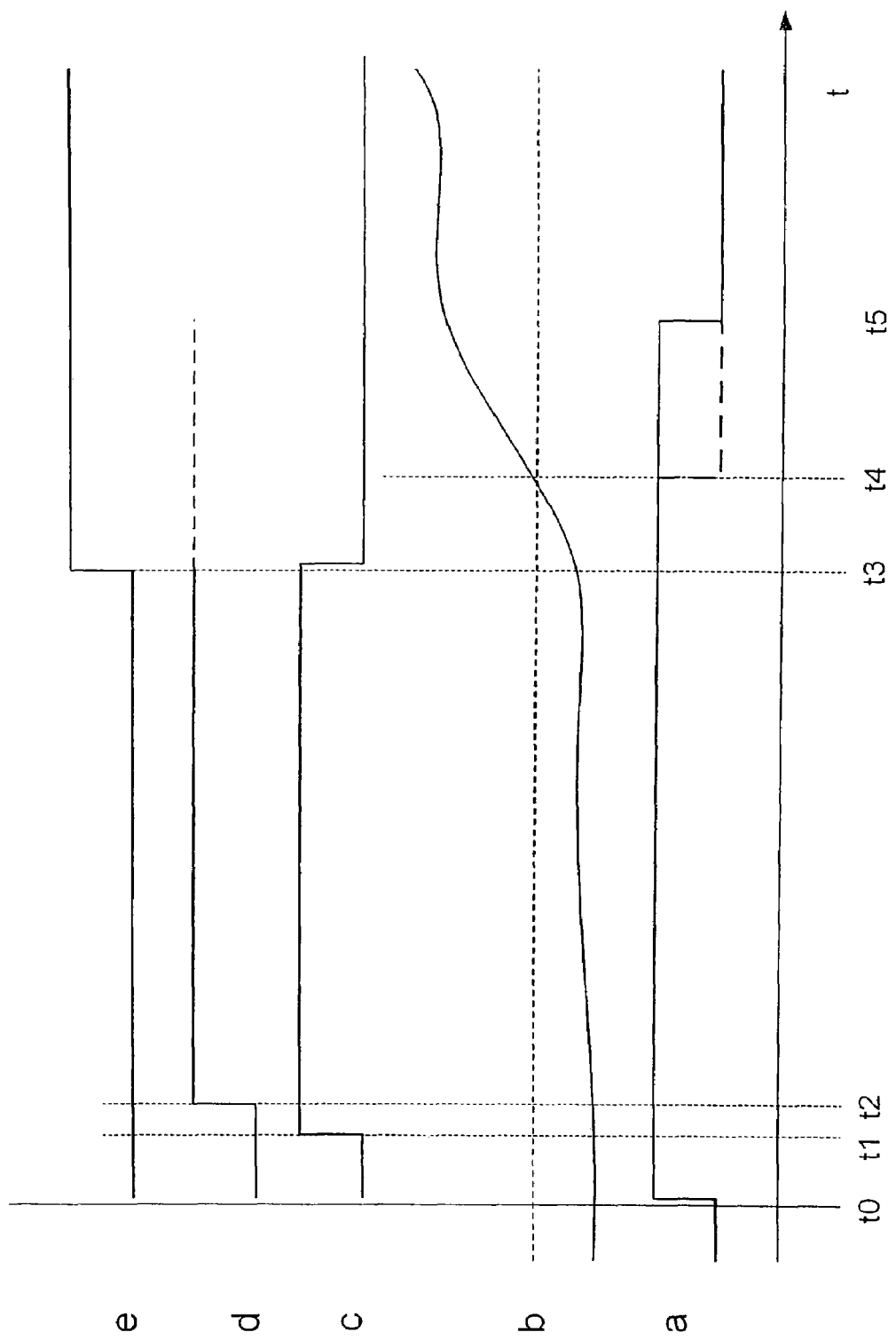
FIG. 2 is a schematic view of plots showing parameters for the process according to an embodiment of the invention.

In FIG. 2 exemplary temporal curves for the process according to an embodiment of the invention are represented in schematic form. The curve a shows a request signal for starting and ending the brake pressure holding time. The curve b shows the curve for the drive torque ($M_{Ant}$) in comparison to a threshold value for a drive torque of the drive unit sufficient to drive away without rolling back. The curve c shows a request signal for opening and (once again) closing the coupling unit. The curve d shows a request signal for carrying out the detection of slippage or slippage detection routine. The curve e shows the signal of an acceleration pedal.

At the time t0 the motor vehicle is supposed to come to a standstill after a stopping or braking process. Immediately after the stopping of the motor vehicle a request signal for starting the brake pressure holding time is triggered according to curve a, whereby a predefined brake pressure, e.g., on all four wheels of the motor vehicle, is held or increased depending on or independently of the extent of brake pedal actuation and held (further) until a brake pressure reduction condition is present. The latest brake pressure reduction condition is in the present case the expiration of a time t5–t0. An additional brake pressure reduction condition is, however, also the overshooting of the threshold for a drive torque of the drive unit sufficient to drive away without rolling back. This brake pressure reduction condition is present according to curve b in the present case at the time t4. Thus the brake pressure holding time is t4–t0.

Shortly after the beginning of the holding time the detection of slippage is prepared at the time t1 by outputting a request signal for opening a coupling unit and the command for the reduction of the brake pressure on a wheel decoupled from the drive by the opening of the coupling unit. Immediately after the opening of the coupling unit and the reduction of the brake pressure on the decoupled wheel the slippage detection routine according to curve d is started, in which routine it is queried whether the decoupled wheel is rolling. In the present case the slippage detection routine remains active until a signal indicates an event which permits the system to infer the driver's wish to drive away rapidly. According to curve e the exemplary event may be the actuation of the acceleration pedal switch at the time t3. Immediately thereupon follows the request signal for re-engagement of the all-wheel drive by the (re-)closing of the coupling unit.

This process according to the invention is carried out in a control unit, as described, for example, in FIG. 1. The input signals required for this are already present in known control units. The invention accordingly may be realized for example, by a new software module in a control unit which is already present in the vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for controlling the brake system of a motor vehicle with all-wheel drive, comprising:
   controlling at least one coupling unit with an electronic control unit, for engaging and disengaging a drive unit of the all-wheel drive;
   decoupling, under corresponding control of the at least one coupling unit, at least one wheel from the drive unit;
   performing one of holding and increasing a predefined brake pressure on at least one wheel of the motor vehicle, after a stop of the vehicle on a slope, in one of a dependent and independent manner relative to an extent of brake pedal actuation;
   further holding the predefined brake pressure during a brake pressure holding time until a brake pressure reduction condition is present;
   reducing at least temporarily, during the brake pressure holding time, the brake pressure on the at least one wheel; and for detecting slippage, maintaining decoupled the at least one wheel from the drive unit under corresponding control of the at least one coupling unit while at least another wheel remains pressurized with brake pressure 2. Process according to claim 1, further comprising:
only carrying out the reduction of the brake pressure on the at least one wheel during the braking force holding time for a minimum period of time required for the detection of slippage;
during the minimum period of time holding in the opened state the at least one coupling unit opened for the decoupling of the wheel;
after expiration of the minimum period of time, controlling the at least one coupling unit during the remaining braking force holding time in such a manner that the drive unit of the all-wheel drive is re-engaged.

3. Process according to claim 2, further comprising controlling the at least one coupling unit for re-engaging the all-wheel drive during the braking force holding time as soon as a definite event takes place, the definite event permitting the electronic control unit to infer a driver's intent to drive away rapidly.

4. Process according to claim 3, further comprising checking the event which permits the system to infer the driver's intent by evaluating signals of at least one of an acceleration pedal value, clutch switch, clutch path, rotary speed of the motor, motor torque, input rotary speed of the transmission, output rotary speed of the transmission, input torque of the transmission, output torque of the transmission, rotary speed difference for the at least one coupling unit and torque difference for the at least one coupling unit.

5. A device for controlling a brake system of a motor vehicle having an all-wheel drive mode; comprising:
an electronic control unit for selecting the all wheel drive mode;
at least one coupling unit, controllable by the electronic control unit, for electronically controlled engagement and disengagement of the all-wheel drive mode, wherein under control of the coupling unit, at least one wheel is decoupled from a drive unit;
means to prevent rolling away of the motor vehicle, after stopping of the motor vehicle on a slope, for one of increasing and holding a predefined brake pressure on at least one wheel of the motor vehicle in one of a dependent and independent manner relative to an extent of brake pedal actuation, during a brake pressure holding time until a brake pressure reduction condition is present; and
slippage detection means for detecting slippage of the at least one wheel and for, during the brake pressure holding time, reducing at least temporarily a brake pressure on the at least one wheel, wherein for detecting slippage the at least one wheel is decoupled from the drive unit under control of the coupling unit, and at least another wheel remains pressurized with brake pressure.

6. Device according to claim 5, wherein the means for preventing rolling away are adapted to carry out the reduction of the brake pressure on the at least one wheel during the braking force holding time only for a minimum period of time to detect slippage, and are adapted to, during the minimum period of time, hold open the at least one coupling unit opened for the decoupling of the wheel,
and wherein the control unit is adapted to, after expiration of the period of time, control the at least one coupling unit during a remaining braking force holding time in such a manner that the all-wheel drive mode is re-engaged.

7. Device according to claim 6, wherein the electronic control unit controls the at least one coupling unit for re-engaging the all-wheel drive mode during the braking force holding time as soon as a definite event takes place, which permits the electronic control unit to infer a driver's intent to drive away rapidly.

8. Device according to claim 7, wherein the electronic control unit is adapted to check the definite event which permits the system to infer the driver' intent by evaluation of signals from at least one of an acceleration pedal value, clutch switch, clutch path, rotary speed of the motor, motor torque, input rotary speed of the transmission, output rotary speed of the transmission, input torque of the transmission, output torque of the transmission, rotary speed difference for the at least one coupling unit and torque difference of the at least one coupling unit.

9. A method for controlling a braking system of a vehicle, comprising the acts of:
after the vehicle stops, decoupling at least one wheel of the vehicle from a drive unit by disengaging at least one coupling unit of an all-wheel drive system connecting the drive unit to the at least one wheel;
applying a predefined brake pressure to wheels of the vehicle during a brake pressure holding time;
reducing, during at least part of the brake pressure holding time, brake pressure applied to the at least one wheel, while maintaining the brake pressure applied to at least another wheel; and
determining slippage of the vehicle by monitoring rotation of the at least one wheel, while decoupled from the drive unit and with reduced brake pressure.

10. The method according to claim 9, further comprising disengaging the at least one coupling unit, applying a brake pressure and reducing the brake pressure to the at least one wheel by operating an electronic control unit.

11. The method according to claim 9, further comprising terminating the brake pressure holding time when a brake pressure reduction condition is present.

12. The method according to claim 9, further comprising terminating the brake pressure holding time when inferring a driver' intent to drive away the vehicle.

13. The method according to claim 11, further comprising determining the brake pressure reduction condition by evaluating signals of at least one of an acceleration pedal value, clutch switch, clutch path, rotary speed of the motor, motor torque, input rotary speed of a transmission, output rotary speed of the transmission, input torque of the transmission, output torque of the transmission, rotary speed difference for the at least one coupling unit and torque difference for the at least one coupling unit.

14. The method according to claim 9, further comprising determining slippage of the vehicle after the vehicle stops on a slope.

15. The method according to claim 11, further comprising, when the brake pressure reduction condition is present, releasing the predefined braking pressure from the wheels, and coupling the at least one wheel to the drive unit.

16. The method according to claim 9, further comprising applying the predefined brake pressure independently of brake pedal actuation.

* * * * *